US009463904B2

(12) United States Patent
Cobler

(10) Patent No.: US 9,463,904 B2
(45) Date of Patent: *Oct. 11, 2016

(54) THERMOPLASTIC FILMS WITH ENHANCED RESISTANCE TO PUNCTURE AND TEAR

(71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,911

(22) Filed: May 13, 2016

(65) Prior Publication Data

US 2016/0251119 A1    Sep. 1, 2016

Related U.S. Application Data

(63) Continuation of application No. 15/044,190, filed on Feb. 16, 2016, now Pat. No. 9,365,323, which is a continuation of application No. 14/061,820, filed on Oct. 24, 2013, now Pat. No. 9,290,303.

(51) Int. Cl.
*B65D 33/00* (2006.01)
*B65F 1/00* (2006.01)

(52) U.S. Cl.
CPC .............. *B65D 33/00* (2013.01); *B65F 1/0006* (2013.01)

(58) Field of Classification Search
CPC .............................. B65D 33/00; B65F 1/0006
See application file for complete search history.

*Primary Examiner* — Michael C Miggins
(74) *Attorney, Agent, or Firm* — Daniel J. Layden; Brandon J. Lee

(57) ABSTRACT

The present invention relates to a thermoplastic film having improved tear and puncture resistance. The thermoplastic has a plurality of embossed regions that are comprised of a plurality of parallel, linear embosses. The plurality of embossed regions is arranged so that a straight line cannot traverse the thermoplastic film without intersecting at least one of the plurality of embossed regions.

20 Claims, 5 Drawing Sheets

THERMOPLASTIC FILMS WITH ENHANCED RESISTANCE TO PUNCTURE AND TEAR

CROSS-REFERENCE TO RELATED APPLICATIONS

Figure 1:
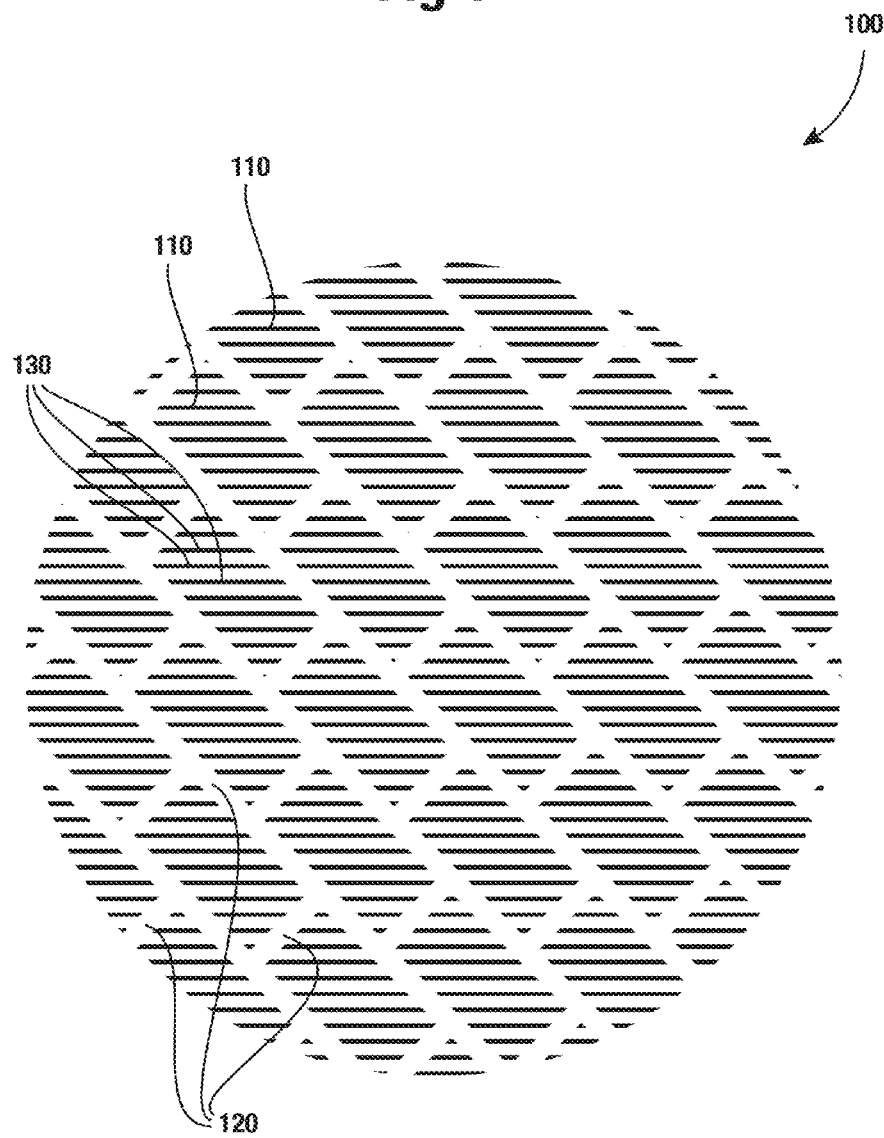

This application is a continuation of application Ser. No. 15/044,190, filed Feb. 16, 2016, which is a continuation of application Ser. No. 14/061,820, filed Oct. 24, 2013, now U.S. Pat. No. 9,290,303. The aforementioned applications and patent are hereby incorporated by reference into this disclosure.

BACKGROUND OF THE INVENTION

1. Field of the Invention

The present invention relates to improvements for thermoplastic films, particularly thermoplastic films used in the manufacture of bags including trash bags. In particular, the present invention relates to improvements to trash bags and embossed patterns for such bags.

2. Description of the Related Art

Thermoplastic films are used in a variety of applications. For example, thermoplastic films are used in sheet form for applications such as drop cloths, vapor barriers, and protective covers. Thermoplastic films can also be converted into plastic bags, which may be used in a myriad of applications. The present invention is particularly useful to trash bags constructed from thermoplastic film, but the concept and ideas described herein may be applied to other types of thermoplastic films and bags as well.

Depending on the application, the use of thermoplastic film presents technical challenges due to the fact that thermoplastic film is inherently soft and flexible. Specifically, all thermoplastic films are susceptible to puncture and tear propagation. In some instances, it may be possible to increase the thickness of the film or select better polymers to enhance the physical properties of the film. However, these measures increase both the weight and cost of the thermoplastic film and may not be practicable. In light of the technical challenges of thermoplastic film, techniques and solutions have been developed to address the need for improved shock absorption to reduce the likelihood of puncture. For example, it is known to impart stretched areas into thermoplastic films as a means of inducing shock absorption properties into the film.

U.S. Pat. No. 5,205,650, issued to Rasmussen and entitled *Tubular Bag with Shock Absorber Band Tube for Making Such Bag, and Method for its Production*, discloses using thermoplastic film material with stretchable zones wherein the film material has been stretched in a particular direction with adjacent unstretched zones that extend in substantially the same direction. The combination of the stretched zones and adjacent unstretched zones provides a shock absorber band intended to absorb energy when the bag is dropped. Specifically, when a bag is dropped or moved, the contents inside the bag exert additional forces that would otherwise puncture or penetrate the thermoplastic film. However, the shock absorber bands absorb some of the energy and may prevent puncture of the film.

Another example of a thermoplastic film material designed to resist puncture is disclosed in U.S. Pat. No. 5,518,801, issued to Chappell and entitled *Web Materials Exhibiting Elastic-Like Behavior*. Chappell, in the aforementioned patent and other related patents, discloses using a plurality of ribs to provide stretchable areas in the film much like Rasmussen. Chappell also discloses methods of manufacturing such thermoplastic film with such ribs.

Another example of shock absorption to prevent puncture is disclosed in U.S. Pat. No. 5,650,214 issued to Anderson and entitled *Web Materials Exhibiting Elastic-Like Behavior and Soft Cloth-Like Texture*. Anderson discloses using a plurality of embossed ribs defining diamond-shaped areas with a network of unembossed material between the diamond-shaped areas. Thus, the unembossed area comprises a network of straight, linear unembossed material extending in two perpendicular directions.

The foregoing specifically address the desire to increase the shock absorption of the thermoplastic film to reduce the likelihood of punctures occurring in the film. However, none of the foregoing solutions address the problem of reducing tear propagation in a thermoplastic bag.

Previously known solutions to limiting tear propagation are based on two primary concepts. First, longer and more tortuous tear paths consume more energy as the tear propagates and can help in limiting the impact of the tear in a bag or thermoplastic film. Second, many thermoplastic films, particularly thermoplastic films made using a blown-film extrusion process, have different physical properties along different axes of the film. Consequently, certain prior art solutions take advantage of the differential properties of thermoplastic films by redirecting tears into a different direction which offers greater resistance to the propagating tear. For example, some solutions redirect a tear propagating in the weaker machine direction of blown film into the stronger cross-direction.

One solution for reducing tear propagation s based on the idea that longer, tortuous tear paths are preferable and is described in U.S. Pat. No. 6,824,856, issued to Jones and entitled *Protective Packaging Sheet*. Jones discloses materials suitable for packaging heavy loads by providing an embossed packaging sheet with improved mechanical properties. Specifically, a protective packaging sheet is disclosed where surfaces of the sheet material are provided with protuberances disposed therein with gaps between protuberances. The protuberances are arranged such that straight lines necessarily intersect one or more of the protuberances. The resulting protective packaging sheet provides mechanical properties where tears propagating across the thermoplastic sheet are subject to a tortuous path. The tortuous path is longer, and more complex, than a straight-line tear, and a tear propagating along such a path would require markedly more energy for continued propagation across the film compared to a tear along a similar non-tortuous path in the same direction. Thus, due to the increased energy required for tear propagation, the tortuous path ultimately reduces the impact of any tears that do propagate across the film.

Another example of a tear resistant plastic film is disclosed in U.S. Pat. No. 8,357,440, issued to Hall and entitled *Apparatus and Method for Enhanced Tear Resistance Plastic Sheets*. Hall discloses an alternative tortuous path solution and further relies on the fact that certain polymer films, particularly thermoplastic films made in a blown-film extrusion process, are known to have a stronger resistance to tear in the cross direction (also known as the transverse direction) when compared to the machine direction (i.e. the direction in which the film is extruded). The cross direction (or transverse direction) is perpendicular to the machine direction and extends around the circumference of a blown-film tube or across the width of a flattened film.

Hall discloses a solution that contemplates using preferably shaped embosses, particularly convex shaped embosses with a curved outer boundary, to provide maximum resistance to tear propagation. In most thermoplastic films, a tear will have a tendency to propagate along the path of least resistance or in the machine direction. Hall contemplates redirecting propagating tears in a tortuous path with the additional intent of redirecting the machine direction tears along the curved edges of the embossed regions and into a cross direction orientation. The redirected tears in the cross direction will be subject to additional resistance and, preferably, will propagate to a lesser degree than a tear propagating in the machine direction in an unembossed film.

Unlike the references described earlier, Jones and Hall are primarily focused on resistance to tear propagation after a puncture has occurred rather than attempting to prevent the puncture from occurring in the first place. It would be desirable to balance both of these properties, shock absorption and tortuous tear paths in the cross direction, into a single, practicable thermoplastic film. Specifically, it would be desirable to provide a thermoplastic film with a shock absorbing feature to prevent punctures in a film while also providing increased resistance to tear propagation. The present invention addresses these needs.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

FIG. 1 provides an elevation view of a first embodiment of the present invention.

Figure 2:
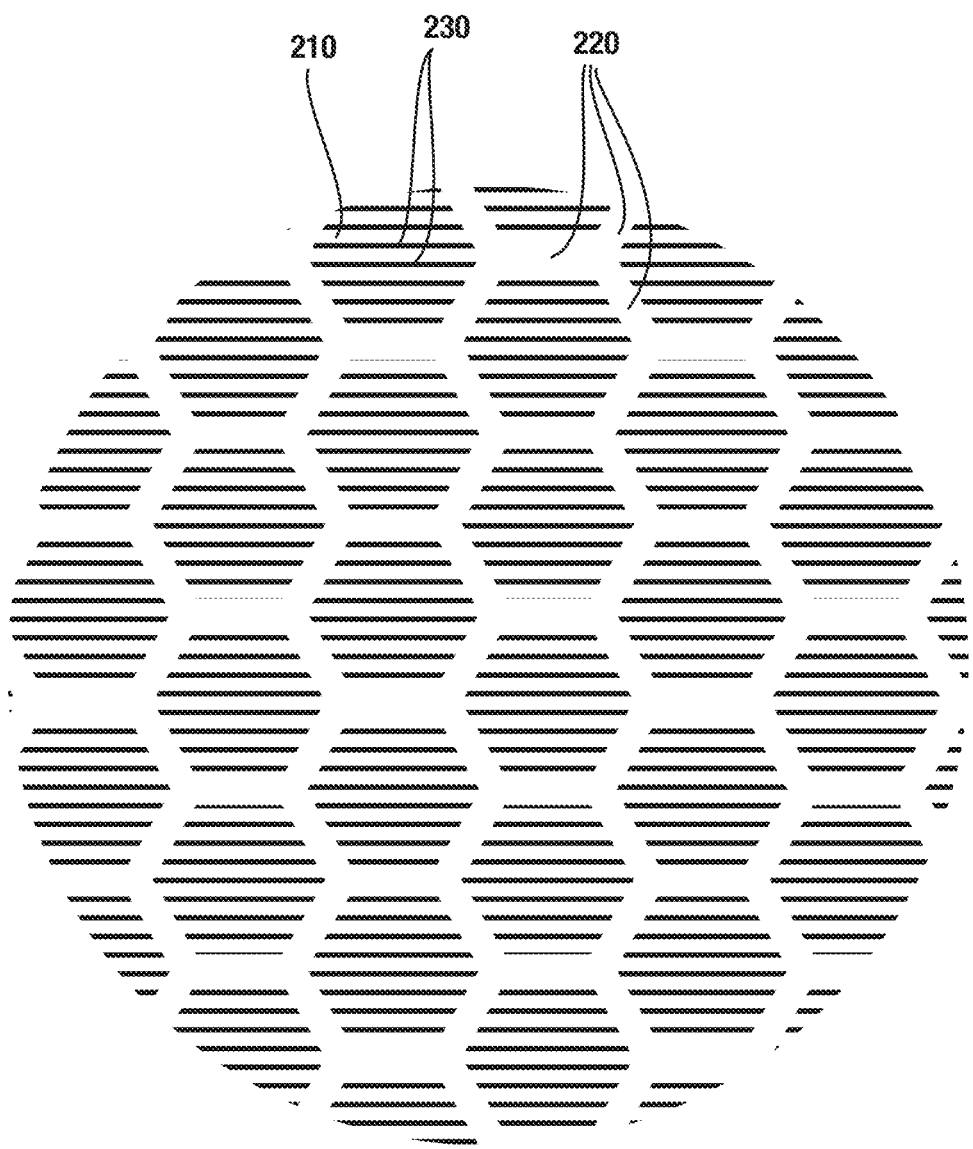

FIG. 2 provides an elevation view of a second embodiment of the present invention.

Figure 3:
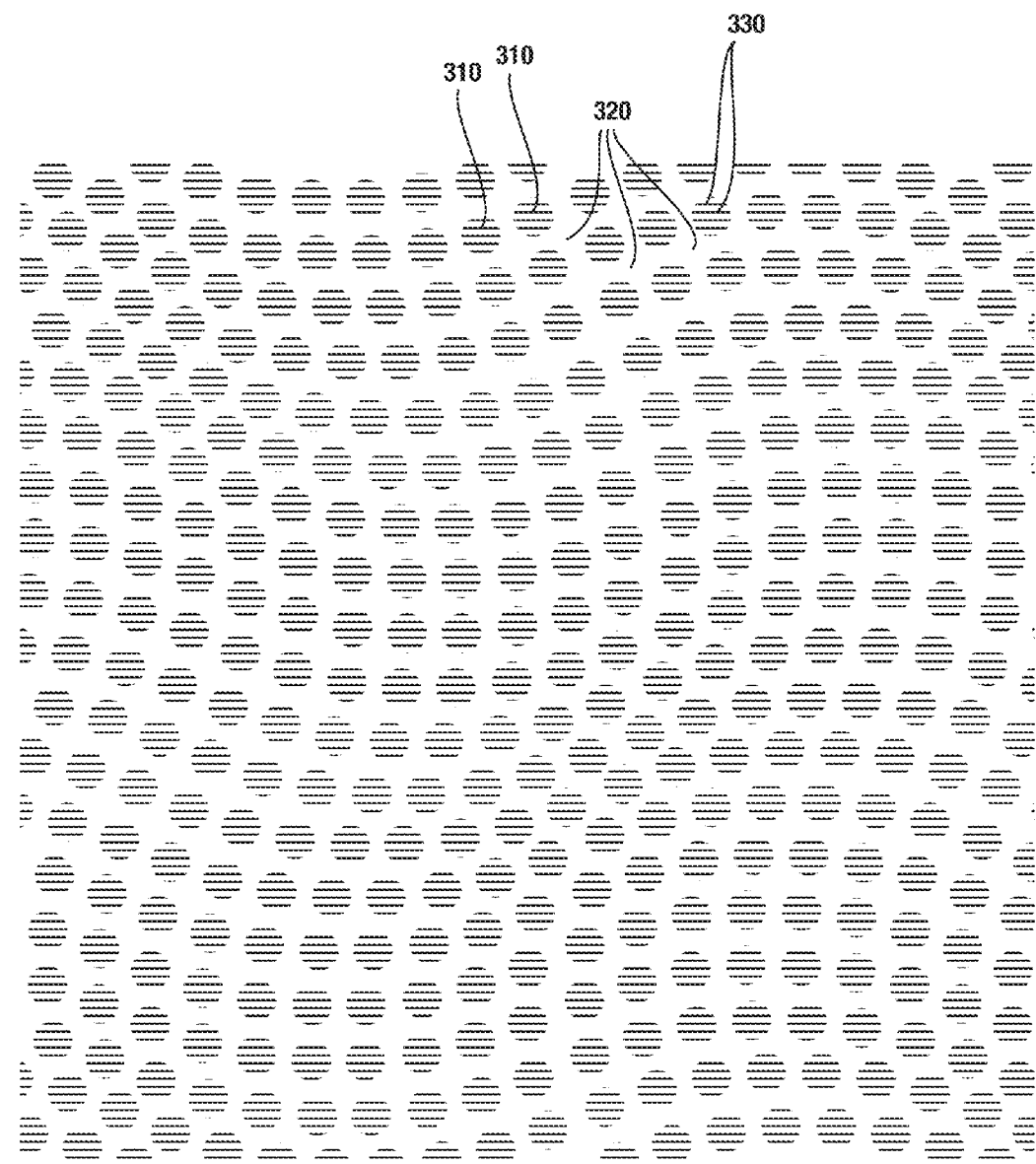

FIG. 3 provides an elevation view of a third embodiment of the present invention.

Figure 4:
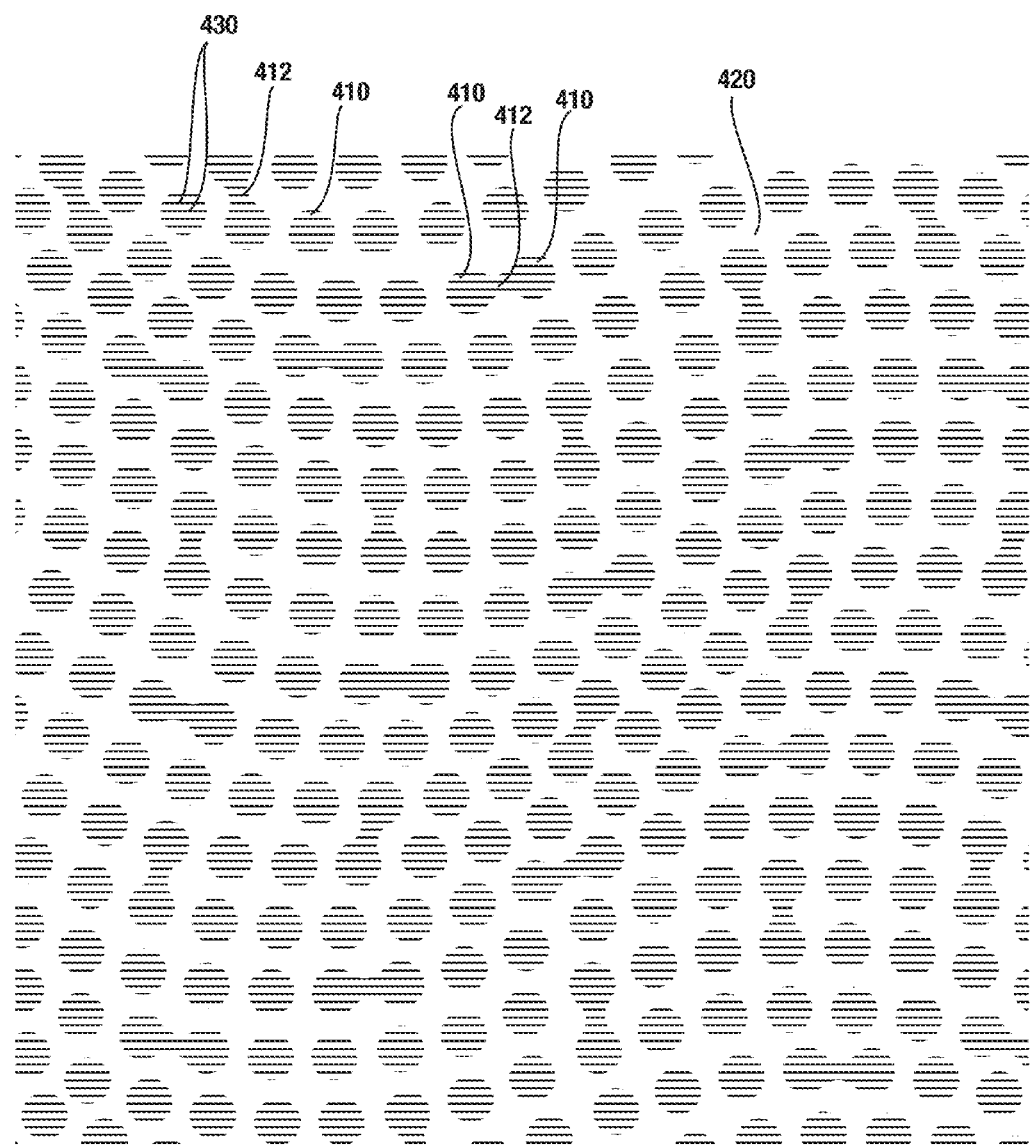

FIG. 4 provides an elevation view of a fourth embodiment of the present invention.

Figure 5:
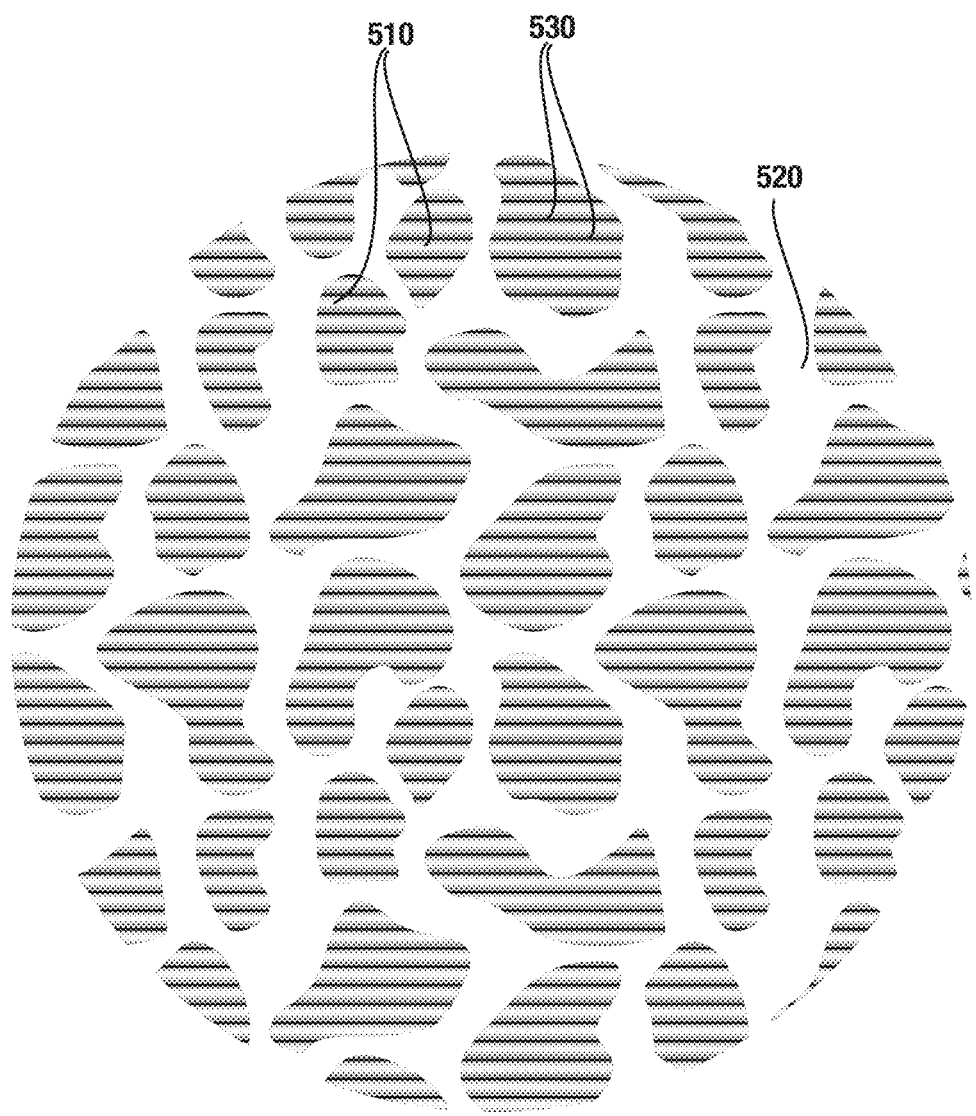

FIG. 5 provides an elevation view of a fifth embodiment of the present invention.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Referring initially to FIG. 1, a perspective view of a first embodiment of the present invention is shown. In particular, a thermoplastic film 100 is embossed with a plurality of embossed regions 110, where each of the plurality of embossed regions 110 is separated by a continuous, unembossed arrangement 120. Each of the embossed regions 110 comprises a plurality of parallel, linear embosses 130. The parallel, linear embosses 130 are all arranged in a parallel fashion to facilitate expansion of the film in a particular direction. Furthermore, the parallel, linear embosses 130 extend substantially across the entire embossed region 110.

In certain preferred embodiments of the present invention, the embossed regions 110 are provided with rounded corners, rather than sharp corners. As discussed with respect to the prior art, it is known that tears have a tendency to propagate along the edges of the embossed regions. Embossed regions with continuously curved borders, i.e. without sharp corners, encourage propagating tears to follow the edge of the embossed region. In contrast, when an embossed region is provided with sharp corners, the tear is more likely to diverge from the edge of the embossed region and will no longer be guided by the embossed region. Typically, such tears will continue propagating in the same direction which may provide less resistance along a less tortuous path.

The present invention builds on the concepts of tortuous path and redirecting tears in a direction that provides more resistance to continued propagation of the tear by preferably utilizing rounded corners on the embossed regions. Specifically, looking at the embodiment of FIG. 1, the embossed regions 110 have generally rounded corners rather than sharp corners to facilitate redirection of tears propagating along the perimeter of said embossed region and into a more tortuous path that may offer increased tear resistance.

FIG. 2 shows a second embodiment of the present invention. In this embodiment, the thermoplastic film has a plurality of embossed regions 210 that are generally hexagonal in shape with rounded corners to facilitate tear redirection. Like the previous embodiments, the embossed regions 210 have a plurality of parallel, linear embosses 230. Moreover, due to the hexagonal geometry, the continuous, unembossed arrangement 220 does not provide any location where a continuous, straight line can be drawn across the arrangement 220. This is important because a tear propagating in the unembossed arrangement 220 cannot follow a continuous path in the machine direction, where the film is inherently weaker. Instead, assuming the tear follows the edges of the embossed regions 210, the tear will follow a longer path that will be, at least partially, in the cross direction.

FIG. 3 shows a third embodiment of the present invention. In this third embodiment, the thermoplastic film has a variety of circular embossed regions 310 arranged along a series of parallel sinusoidal paths in the thermoplastic film separated by a continuous, unembossed arrangement 320. This continuous, unembossed arrangement 320 offers unique advantages in that a continuous straight-line path is generally not possible assuming the size of the embossed regions 310 are properly sized, the amplitude of the sinusoidal path is sufficiently large, and there is sufficient frequency of the embossed regions 310 along the sinusoidal path. Thus, as a tear propagates across the film, it will necessarily intersect with one of the embossed regions 310. Such tears will have a tendency to propagate around the edges of the embossed regions 310 and into varying directions.

In the embodiment disclosed in FIG. 3, the embossed regions 310 are preferably arranged along a series of parallel, sinusoidal lines extending in a first direction. The peak amplitude, measured from the center of the sinusoidal wave to the peak of the sinusoidal wave is typically at least ½ of the diameter of the embossed regions 310. In some embodiments of the present invention, the embossed regions 310 are also arranged along a sinusoidal path extending in a second direction. The second direction may by perpendicular to the first direction of the sinusoidal path.

In a preferred embodiment, the embossed regions 310 will all be substantially the same size. However, in other embodiments, the size of the embossed regions 310 may vary. For example, depending on the spacing between nearby embossed regions 310, the size, or even the shapes, of the embossed regions may be modified to provide that the spacing between the embossed regions is more uniform.

FIG. 4 discloses a fourth embodiment of the present invention. In this depicted embodiment, the thermoplastic film has a plurality of circular embossed regions 410 much like the embodiment depicted in FIG. 3. However, in this embodiment, some of the circular embosses are connected to form connecting embossed regions 412 to block some, or even all, of the sinusoidal paths between the circular embosses.

Looking back at FIG. 3, it is apparent that, depending on the size of the embossed regions 412 and the amplitude of the sinusoidal path of embossed regions 412, a tear may propagate along a sinusoidal path between the sinusoidal paths of the embossed regions 412. Properly selecting the amplitude of the sinusoidal waves, adjusting the location of the embossed regions 412 along the sinusoidal path, and modifying the sizes of the various embossed regions may be used, individually or in combination with one another, to prevent tears from propagating along the sinusoidal paths by forcing tears to continually encounter embossed regions 412 and propagate around the perimeter of said embossed regions 412

Looking now at FIG. 5, a fifth embodiment of the present invention is depicted wherein the embossed regions are random shapes with substantially curved edges. More importantly, it is desirable that a continuous, linear path cannot be drawn across the unembossed arrangement to prevent the propagation of tears across the thermoplastic film.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

I claim:

1. A thermoplastic bag comprising:
a first panel and a second panel of thermoplastic film, the first panel and the second panel joined along a first side edge, a second side edge, and a bottom edge, a top edge of the first panel and the second panel defining an upper opening of the bag,
a plurality of embossed regions embossed into the first panel and the second panel, the plurality of embossed regions separated by a continuous, unembossed arrangement,
each of the plurality of embossed regions comprising a plurality of parallel, linear embosses and each embossed region defined by the continuous, unembossed arrangement,
the continuous, unembossed arrangement comprising at least a plurality of first segments, a plurality of second segments, and a plurality of third segments, and
the plurality of first segments extending in a first direction, the plurality of second segments extending in a second direction, and the plurality of third segments extending in a third direction.

2. The thermoplastic bag of claim 1, further comprising:
for each and every set of parallel, linear embosses, said linear embosses parallel to other linear embosses.

3. The thermoplastic bag of claim 1, further comprising:
a majority of the plurality of embossed regions are irregularly shaped.

4. The thermoplastic bag of claim 1, further comprising:
a majority of the plurality of embossed regions are hexagon-shaped.

5. The thermoplastic bag of claim 1, further comprising:
the first direction generally horizontal.

6. The thermoplastic bag of claim 1, further comprising:
the second direction oblique to the first direction and the third direction.

7. The thermoplastic bag of claim 6, further comprising:
the first direction oblique to the second direction and the third direction.

8. The thermoplastic bag of claim 1, further comprising:
the plurality of embossed regions and the continuous, unembossed arrangement extends across substantially an entire width of the first panel and the second panel.

9. The thermoplastic bag of claim 8, further comprising:
the plurality of embossed regions and the continuous, unembossed arrangement extends across substantially an entire area of the first panel and the second panel.

10. A thermoplastic bag comprising:
a first panel and a second panel of thermoplastic film, the first panel and the second panel joined along a first side edge, a second side edge, and a bottom edge, a top edge of the first panel and the second panel defining an upper opening of the bag,
a plurality of embossed regions embossed into the first panel and the second panel, the plurality of embossed regions separated by a continuous, unembossed arrangement,
each of the plurality of embossed regions comprising a plurality of parallel, linear embosses and each embossed region defined by the continuous, unembossed arrangement,
at least one of the plurality of embossed regions comprising a plurality of at least nine linear embosses and each linear emboss having a length greater than a distance between corresponding central axes of adjacent linear embosses,
the continuous, unembossed arrangement comprising at least a plurality of first segments and a plurality of second segments, and
the plurality of first segments extending in a first direction and the plurality of second segments extending in a second direction.

11. The thermoplastic film of claim 10, further comprising:
the plurality of parallel, linear embosses of each plurality of embossed regions parallel to each other.

12. The thermoplastic film of claim 10, further comprising:
a majority of the plurality of embossed regions are irregularly shaped.

13. The embossed pattern of claim 10 further comprising:
each of the plurality of embossed regions having a serpentine shape.

14. The thermoplastic bag of claim 10, further comprising:
the plurality of embossed regions and the continuous, unembossed arrangement extends across substantially an entire width of the first panel and the second panel.

15. A thermoplastic film comprising:
a plurality of embossed regions embossed into the thermoplastic film, the plurality of embossed regions separated by a continuous, unembossed arrangement,
each of the plurality of embossed regions comprising a plurality of parallel, linear embosses and each embossed region defined by the continuous, unembossed arrangement,
the continuous, unembossed arrangement comprising at least a plurality of first segments, a plurality of second segments, and a plurality of third segments, and
the plurality of first segments extending in a first direction, the plurality of second segments extending in a second direction, and the plurality of third segments extending in a third direction.

16. The thermoplastic film of claim 15, further comprising:
the plurality of parallel, linear embosses of each plurality of embossed regions parallel to each other.

17. The thermoplastic film of claim 15, further comprising:
a majority of the plurality of embossed regions are irregularly shaped.

18. The thermoplastic film of claim 15, further comprising:
a majority of the plurality of embossed regions are hexagon-shaped.

19. The thermoplastic film of claim 15, further comprising:
each of the plurality of the embossed regions comprising at least eight parallel linear embosses.

20. The thermoplastic film of claim 15, further comprising:
the first direction, second direction, and third direction oblique to each other.

* * * * *